United States Patent Office 2,727,869
Patented Dec. 20, 1955

2,727,869

PHENOLIC ADHESIVE AND METHOD OF MAKING SAME

Jacob R. Ash and Alan L. Lambuth, Seattle, Wash., assignors to Monsanto Chemical Company, St. Louis, Mo., a corporation of Delaware No Drawing. Application June 12, 1953,
Serial No. 361,404

20 Claims. (Cl. 260—17.2)

This invention relates to improved phenolic adhesive compositions and the method of formulating said adhesives.

More particularly this invention relates to a phenol-aldehyde resin compounded with a granular to finely divided solid residue remaining after the acid hydrolysis of pentosan-containing materials, for example, ground oat hulls, ground corn cobs and the like, and the removal of the furfural and other chemical products produced thereby by steam distillation, solvent extraction, etc., said residue first being reacted with an alkali metal hydroxide or salt which provides a strong basic solution prior to compounding with the phenol-aldehyde resin to provide the novel adhesive formulation of this invention.

A suitable residue is commercially available in large quantities from the Quaker Oats Company and is marketed under the trade-name "Furafil." Furafil is a dark brown powder characterized by a somewhat sweetish or coffee-like odor. The complex nature of the Furafil composition, comprising various degradation products, precludes simple assignment of a chemical structure, but the following analyses are typical of the material and aid to characterize same:

|  | Percent |
|---|---|
| 2% caustic soda extractable | 22 |
| Alcohol soluble | 21 |
| Acetone extractable | 20 |
| Ether extractable | 4 |
| Cellulose | 38 |
| Residue from saccharification | 42 |
| Ash | 3 to 5 |
| Carbon (ultimate analysis) | 52 |

One of the preferred available residues, Furafil 100, is a finely divided material having a bulk density of about 29 pounds per cubic foot, a specific gravity of 1.4, and the following screen analyses:

|  | Percent |
|---|---|
| Thru 100 mesh | 99 |
| Thru 200 mesh | 95 |
| Thru 325 mesh | 90 |

The above finely divided residue had a specific surface of about 6900 cm.²/g. and could be more readily dispersed than other less finely divided materials, and whereas the more finely divided residues are preferred other coarser materials are suitable. An illustrative example of such a suitable less finely pulverized residue was found to have the following screen analyses:

|  | Percent |
|---|---|
| Thru 10 mesh | 98.5 |
| Thru 20 mesh | 85.0 |
| Thru 32 mesh | 78.5 |
| Thru 60 mesh | 51.5 |
| Thru 80 mesh | 41.5 |
| Thru 100 mesh | 34.5 |
| Thru 150 mesh | 28.0 |
| Thru 200 mesh | 21.5 |
| Thru 325 mesh | 15.5 |

Also, a relatively coarse, granular residue was prepared by removing all of the material having a mesh size less than 60 mesh. This material was found to have the following screen analyses:

|  | Percent |
|---|---|
| Thru 10 mesh | 97 |
| Thru 20 mesh | 69 |
| Thru 32 mesh | 56 |
| Thru 60 mesh | 0 |

The aforesaid granular residue had a specific surface of about 450 cm.²/g. and was found suitable for the preparation of adhesive compositions as hereinafter more fully pointed out. Thus, the particle size of the residue can range from a granular to a finely pulverized material, i. e., a major portion of the residue passing through a 32-mesh screen to substantially all of said residue passing through a 100-mesh screen. Accordingly, the upper limit of suitable particle size of the aforesaid residue is characterized by having a minimum specific surface of the order of about 400 to 450 cm.²/g. However, in general, it is preferable that the residue have a particle-size distribution such that at least about 25 percent of the residue, and more preferably still substantially all of the residue pass a 100-mesh standard screen, but it is not essential that a large amount of said material also pass through a screen having smaller openings than the 100-mesh screen. The aforesaid screen could more properly be termed U. S. Sieve Series No. 100, etc., which conforms to rigid standards regarding the dimensions of the wire employed in the fabrication of the screen and the openings of the screen, and it is understood that the designation 100 mesh, etc., is equivalent thereto in this specification.

Heritage, 2,574,784 and 2,574,785, discloses adhesive compositions comprising a phenol-aldehyde resin and finely divided vegetable shell materials selected from the group consisting of nut shells, such as walnut, filbert, and hickory, the endocarps of drupes, such as the apricot, peach, and prune, and the barks of trees, which vegetable material is digested with suitable alkaline materials at an elevated temperature to provide a material which is readily soluble in water. It has been noted that bark flour, for example, does not provide a workable glue when treated with alkali at room temperature and the preparation of the vegetable-shell-material glues may be hazardous to the operator in the glue loft when caustic is added to hot water in that spattering may occur with serious caustic burns to the operator. The hot solution must then be cooled before adding the resin adhesive to prevent premature advancement of the cure of the resin with subsequent short working life in the glue spreader. Further, a steam-jacketed mixer is required to provide heat for adequate digestion of the shell material.

The novel process of this invention does not require external heat for efficient digestion of the solid residue from the acid-hydrolyzed pentosan-containing material, thus avoiding possible caustic burns to the operator by spattering, saving time of cooling the digestion mixture prior to adding the phenol-aldehyde resin without prematurely advancing the state of cure of the resin, and the simplest glue-mixing apparatus, available in all glue lofts, can be employed. Further, the residues employed in this invention are subjected to acid hydrolysis under elevated temperature and pressure which process materially alters the composition of the residue from the original unmodified product, whereas the materials employed by Heritage are not subjected to any chemical treatment prior to digestion with the alkaline material. A third major point of distinction is the fact that the original plant materials are derived from species of far different botanical origin, the materials of Heritage being a product of the perennial trees of the order of Coniferales and Fagales whereas the preferable materials of this invention are products of the annual grasses of the order of Graminales.

Suitable phenol-aldehyde resins which are applicable to this invention are described in Van Epps 2,360,376; Stephan et al. 2,437,981; Redfern 2,457,493 and Re. 23,347; and the like.

Since the resin solids content of various suitable phenol-aldehyde adhesives is not constant, the ratio of the solid residue remaining after the acid hydrolysis of the pentosan-containing material to the resin adhesive is based on parts by weight of said residue to parts by weight of resin solids as determined by the P. M. M. A. method, said method consisting essentially of heating a known quantity of liquid resin for 3 hours at 105° C. and calculating the percent solids from the loss in weight of the original sample in the heating process. It has been found that up to about 40 parts of the residue can be employed per 40 parts of resin solids. In general, adhesive compositions containing up to about 25 parts of residue and preferably from about 10 to about 25 parts of residue per 40 parts of resin solids, said residue being treated with the basic alkali compound prior to the addition of the resin, have been found to provide adhesive compositions which are suitable for bonding wood structures which are exposed to the elements, for example, exterior-grade plywood. The higher ratios of residue to resin solids from about 25 to about 40 parts of residue per 40 parts of resin solids have been found to provide excellent adhesive compositions for bonding interior-grade plywood.

The solid residue remaining after the acid hydrolysis of the pentosan-containing material is digested for a period from about 10 to about 30 minutes with an alkali metal compound from the group consisting of hydroxides, basic acting salts, a 0.1 N aqueous solution of which forms a strongly basic solution having a pH greater than about 9.5, and mixtures thereof, as for example, the lithium, sodium, and potassium hydroxides and carbonates, and the like. The quantity of basic alkali compound necessary to treat the residue ranges from about 10 to about 45 parts by weight of sodium hydroxide, or a substantially equivalent amount of another suitable alkali compound, or mixtures thereof, per 100 parts by weight of residue. The alkali solution can be prepared in a conventional manner by introducing the required quantity of alkali compound, or compounds, to a predetermined amount of water at room temperature (about 50 to about 70° F.). The alkali compound can be employed as the solid, in which case the more readily soluble forms should be employed, as for example, flake caustic soda, or as commercial solution, as for example, 50 percent sodium hydroxide. Where commercial alkali solutions are employed the proper allowance must be made in the dilution water to obtain the proper final alkali concentration. In general it is preferable to prepare the alkali solution just prior to use of the adhesive composition. The residue first can be suspended in the dilution water or can be added after the alkali solution is prepared, the former procedure generally being preferred. In this manner the heat of reaction, solution, and dilution of the alkali aids the digestion of the residue. After the alkali is added to the suspended residue, agitation is continued for from about 10 to about 30 minutes or more. Then the predetermined amount of phenol-aldehyde resin is added with mild agitation and stirred for from about 5 to about 10 minutes or more to assure proper mixing, then the adhesive composition is ready for use. If desired the warm alkali-residue mixture can be cooled to about 70 to 90° F. prior to the addition of the resin, but this is not necessary since the resin itself will cool the mixture sufficiently to prevent any hazard of precure to the finished adhesive composition.

The novel adhesive composition of this invention can be further modified with extenders, i. e., amylaceous materials, blood and other proteinaceous materials, fillers, hardening agents, antifoam agents, buffer salts, dyes, and the like to provide special adhesive compositions for specific purposes. These are conventional modifiers well-known to those skilled in the art.

In general, the viscosity of the adhesive composition is not critical as long as the adhesive is spreadable in the conventional mechanical spreaders as employed in the plywood industry. A suitable range is from about 20 to about 3000 as determined with the MacMichael viscosimeter with a number 26d wire at 70° F. This method of measuring viscosity is widely used in the plywood industry and further details of the procedure are disclosed in Stephan et al., supra.

Whereas the novel adhesive composition of this invention can be used in various applications requiring a thermosetting adhesive, it is particularly adapted to the bonding of wood veneer to provide plywood. The spread of the adhesive composition will vary with the type construction being employed and the ultimate intended end use of the plywood being bonded, but in general will range from about 50 to about 65 pounds of wet glue per thousand square feet of double glue line. The assembly time (TA) can vary from about 3 to about 30 minutes or more and preferably from about 10 to about 20 minutes. The press time (TP) can vary from about 3 to about 8 minutes or more depending on the temperature of the platens, the type construction being bonded, the number of panels per opening, etc. The bonded plywood is normally hot-stacked to further advance the cure of the adhesive, thereby utilizing the heat gained during the pressing cycle. In general, platen temperatures of from about 260 to about 285° F. are recommended and the pressure should be about 175 p. s. i. when the veneer is Douglas fir. Hardwoods generally require a somewhat higher pressure and the upper limit of suitable pressure is the highest pressure which can be employed without effecting a substantial crushing action on the wood species being bonded.

The principal significant evaluation tests which indicate the utility of the plywood construction unit are sheer tests which are set up to determine the relative strength of the glue bond to the wood species being bonded. The shear tests are run under various conditions, as for example, dry, wet, and boil tests and are reported as the shear stress necessary to break the test specimen along, or near, the glue line in pounds per square inch and the percent of wood failure present at the ruptured bond. Thus the figure 200–98 signifies that a shear stress of 200 p. s. i. was necessary to rupture the specimen and the wood failure was 98 percent.

The dry-shear tests are run on 1 x 3-inch shear samples which are scored to the glue line under test from opposite sides, the two cuts being placed so as to apply the subsequently applied stress to a one-inch square area. The samples are conditioned for at least two days, then stressed to destruction and examined for the percent of wood failure. The wet-shear tests are run on similar shear samples, but are soaked in water at room temperature for 48 hours prior to testing and are tested in the wet condition. The boil-shear tests are also run on similar shear samples but are subjected to 4-hours' immersion in boiling water, after which they are removed and dried at 140° F. for 20 hours, then again immersed in boiling water for 4 hours, removed and stressed to destruction while still wet.

The following examples are illustrative of the invention.

*Example 1*

A pilot-plant glue mixer was charged with 50 pounds of water at 70° F., agitation started and 20 pounds of Furafil 100, 10 pounds of clay, and 4 pounds of a 50-percent solution of sodium hydroxide were added thereto and mixing continued for about 10 minutes, during which time the temperature of the mixture was about 110° F. Then 100 pounds of a phenol-formaldehyde resin having a MacMichael viscosity of 38 on the 26d wire was added and mixing continued for 5 minutes. The resin was prepared by the condensation reaction of 1.0 mole of phenol with 1.8 moles of formaldehyde in the presence of 0.75 mole of sodium hydroxide, which latter was added in three portions of 0.15, 0.3 and 0.3 mole, respectively, and the P. M. M. A. solids of the resin was about 40 percent. The viscosity of the adhesive composition was found to be 25 on the 26d wire at 70° F.

Several 22 x 22-inch, 5-ply, Douglas fir panels were made up with the above adhesive with wet spreads of 60 pounds per thousand square feet of double glue line. The 13⁄16-inch panel constructions were pressed at 285° F. and 175 p. s. i. for 7.5 minutes. The panels were tested with the following results:

| TA | Shear Results | | |
|---|---|---|---|
| | Dry | Wet | Boil |
| 3 | 275–100 | 200–100 | 180–92 |
| 10 | 255–100 | 186–97 | 143–90 |

These test results indicate that the above adhesive composition provides excellently bonded panels of exterior-grade plywood.

Example 2

The glue mixer of Example 1 was charged with 60 pounds of water at 70° F., agitation started and 25 pounds of Furafil 100, 10 pounds of a 50-percent solution of sodium hydroxide, and 5 pounds of soda ash were added thereto and mixing continued for about 20 minutes. Then 100 pounds of a phenol-formaldehyde resin, similar to that of Example 1, and 0.5 pound of pine oil defoamer, were added. The resin had a viscosity of 39 on the 26d wire and contained about 40 percent resin solids. The adhesive composition was found to have a viscosity of 220 on the 26d wire at 70° F. and a pH of 10.75.

Several 13⁄16-inch, 5-ply, Douglas fir panels were made under similar conditions to the panels prepared in Example 1, but the assembly time was 20 minutes. Shear tests were found to be 240–98, 229–81 and 204–93, respectively, when tested for dry-, wet-, and boil-shear strengths.

A 1000-pound batch of the above adhesive composition was prepared and tested under commercial conditions. Commercial 4 x 8-foot, 5-ply, Douglas fir panels were made up with the above adhesive with wet spreads of about 54 pounds per thousand square feet of double glue line. The 9⁄16-inch panel constructions were pressed at 270° F. and about 175 p. s. i. for 5.5 minutes. The 11⁄16-inch panel constructions were pressed at 285° F. and about 175 p. s. i. for 6.5 minutes. The spread was noted to be excellent, no blisters, or blow-outs, were encountered in pressing the laminated article, and the final adhesion was judged to be excellent. Samples from these panels were tested according to the Douglas Fir Plywood Association procedure for concrete-form-grade plywood and all samples were found to pass this test with a rating of 100 percent.

Example 3

The glue mixer of Example 1 was charged with 30 pounds of water at 70° F., agitation started and 12 pounds of Furafil 100, 6 pounds of a 50-percent solution of sodium hydroxide, and 3 pounds of soda ash were added thereto and mixing continued for about 10 minutes. Then 100 pounds of a phenol-formaldehyde resin having a viscosity of 44 on the 26d wire and a P. M. M. A. solid content of about 40 percent was added and mixing continued for 10 minutes. The viscosity of the adhesive composition was found to be 64 on the 26d wire at 70° F.

Several 9⁄16-inch, 5-ply, Douglas fir panels were made in a similar manner to Example 1, but the press temperature was 270° F., the assembly time was 10 minutes, and the press time was 5.5 minutes. Shear test samples were prepared and evaluated. The shear strengths for dry, wet, and boils, respectively, were found to be 250–100, 292–95 and 258–100, which results indicate a very excellent exterior-grade plywood.

Example 4

The glue mixer of Example 1 was charged with 60 pounds of water at 50° F., agitation started, then 25 pounds of Furafil 100, 10 pounds of a 50-percent sodium hydroxide solution, and 5 pounds of soda ash were added thereto and mixing continued for about 20 minutes. The exothermic reaction raised the temperature of the reaction mixture to about 70° F., where it was held with cooling water. Then 100 pounds of a phenol-formaldehyde resin at 70° F. and 0.5 pounds of diesel oil were added and agitation continued for about 10 minutes. The viscosity of the adhesive composition was found to be 184 on the 26d wire at 70° F.

Several 22 x 22-inch, 3-ply, Douglas fir panels were made up with the above adhesive composition with wet spreads of 55 pounds per thousand square feet of double glue line. The 5⁄16-inch panel constructions were placed in the hot press, two panels per opening, and pressed at 285° F. and 175 p. s. i. for 5 minutes. Test specimens were prepared and evaluated with the following results:

| TA | Shear Results | | |
|---|---|---|---|
| | Dry | Wet | Boil |
| 20 | 231–100 | 203–70 | 175–100 |
| 30 | 328–100 | 226–66 | 200–88 |

Example 5

In a similar manner to the above example, 90 pounds of water at 50° F. was added to the glue mixer and 40 pounds of Furafil 100, 12 pounds of a 50-percent solution of sodium hydroxide, and 6 pounds of sodium carbonate were added thereto with agitation, and mixing continued for about 20 minutes. The exothermic reaction effected a temperature rise of the reaction mixture to about 75° F., where it was held with cooling water. Then 100 pounds of a phenolformaldehyde resin and 1 pound of diesel oil were added thereto and mixing continued for about 10 minutes. The viscosity of the adhesive composition was found to be 480 on the 26d wire at 70° F.

Several 22 x 22-inch, 3-ply, Douglas fir panels were made up with the above adhesive composition with wet spreads of 60 pounds per thousand square feet of double glue line. The 5⁄16-inch panel constructions were placed in the hot press, two panels per opening, and pressed at 285° F. and 175 p. s. i. for 5 minutes, the TA being varied from 3 to 30 minutes. All of the test specimens passed the 10-cycle concrete-form-grade plywood test. Accordingly, the adhesive composition of this example provides excellent concrete-form and interior-grade plywood.

Example 6

The glue mixer of Example 1 was charged with 150 pounds of water at 70° F., agitation started and 70 pounds of Furafil, less finely pulverized than the Furafil 100 of the preceding examples, suspended therein. Then 30 pounds of a 50-percent solution of sodium hydroxide and 15 pounds of soda ash were added thereto and mixing continued for about 20 minutes. Then the alkali-pulped residue suspension was cooled to 100° F. and 500 pounds of phenolformaldehyde resin, containing about 40 percent resin solids and having a viscosity of 41 on the 26d wire, was added and mixing continued for 10 minutes. The viscosity of the adhesive composition was found to be 151 on the 26d wire at 70° F.

Several 22 x 22-inch, 5-ply Douglas fir panels were made up with the above adhesive composition with wet spreads of 55 pounds per thousand square feet of double glue line. The 13/16-inch panel constructions were pressed at 285° F. and 175 p. s. i. for 7.5 minutes. The panels were tested with the following results:

| TA | Shear Results | | |
|---|---|---|---|
| | Dry | Wet | Boil |
| 20 | 235-99 | 239-95 | 200-96 |
| 30 | 234-99 | 251-95 | 190-98 |

These test results indicate that the above adhesive composition is suitable for the production of exterior-grade plywood.

Example 7

The glue mixer was charged with 300 pounds of water at 70° F., agitation started and 125 pounds of the less finely pulverized Furafil added thereto. Then 50 pounds of a 50-percent solution of sodium hydroxide and 25 pounds of soda ash were added to the suspended residue and mixing continued for about 20 minutes. Thereafter, 500 pounds of a phenol-formaldehyde resin was added thereto and mixing continued for about 10 minutes. The resin had a viscosity of 40 on the 26d wire and contained about 40 percent resin solids. The adhesive composition was found to have a viscosity of 201 on the 26d wire at 70° F.

Several 22 x 22-inch, 5-ply, Douglas fir panels were made up with the above adhesive composition with wet spreads of 60 pounds per thousand square feet of double glue line. The 13/16-inch panel constructions were pressed at 285° F. and 175 p. s. i. for 7.5 minutes, the TA being varied from 3 to 30 minutes. All of the test specimens passed the 10 cycle concrete-form-grade plywood test. Accordingly, the adhesive composition of this example provides excellent concrete-form and interior-grade plywood.

Example 8

The glue mixer was charged with 155 pounds of water at 70° F., agitation started and 65 pounds of the coarse granular Furafil having a specific surface of about 450 cm.$^2$/g. added thereto. Then 30 pounds of a 50-percent solution of sodium hydroxide and 15 pounds of soda ash were added thereto and mixing continued for about 20 minutes. Thereafter, 500 pounds of a phenolformaldehyde resin was added and mixing continued for about 10 minutes. The resin had a viscosity of 38 on the 26d wire and contained about 40 percent resin solids. The adhesive composition was found to have a viscosity of 94 on the 26d wire at 70° F.

Several 22 x 22-inch, 5-ply, Douglas fir panels were made up with the above adhesive composition with wet spreads of 65 pounds per thousand square feet of double glue line. The 13/16-inch panel constructions were pressed at 285° F. and 175 p. s. i. for 7.5 minutes. The panels were tested with the following results:

| TA | Shear Results | | |
|---|---|---|---|
| | Dry | Wet | Boil |
| 20 | 193-83 | 163-75 | 135-96 |
| 30 | 286-83 | 286-66 | 258-93 |

These test results indicate that the above adhesive composition produces excellent exterior-grade plywood.

In place of the pine oil and diesel oil defoamers, other suitable defoaming agents can be employed, as for example, stove oil and the like.

The quantity of water employed in the adhesive compositions of this invention is limited to that amount wherein the final adhesive composition will provide suitable spreading characteristics to enable said adhesive to be readily spread with the conventional glue spreaders employed in the plywood industry. Accordingly, as aforesaid, the glue viscosity can range from about 20 to about 3000 as measured with the MacMichael viscosimeter using the number 26d wire at 70° F. In general, it is preferable to limit the amount of water used, prior to the addition of the resin, to from about 225 to about 300 pounds of water per 100 pounds of residue.

This application is a continuation-in-part of our prior joint application, Serial No. 286,446, filed May 6, 1952, now abandoned.

We claim:

1. A process for the production of a smooth-spreading aqueous, thermosetting adhesive composition comprising adding in the ratio of 125 parts by weight of a solid furfural by-product residue from the acid hydrolysis of a pentosan-containing material selected from the group consisting of ground oat hulls and ground corn cobs, said residue substantially all passing a 100-mesh standard screen, to 300 parts by weight of water at about 50 to about 70° F. with agitation, then adding 25 parts by weight of sodium hydroxide dissolved in 25 parts by weight of water and 25 parts by weight of sodium carbonate to the aforesaid residue suspension with agitation and mixing same for about 20 minutes, then adding thereto with agitation 500 parts by weight of a phenolformaldehyde resin, having a MacMichael viscosity of from about 15 to about 75 as measured on the number 26d wire at 70° F. and containing about 40 percent resin solids, and 25 parts by weight of pine oil, thereafter continuing agitation for about 10 minutes.

2. A thermosetting adhesive composition comprising an aqueous dispersion containing 40 parts of a water-soluble phenol-aldehyde resin and from 10–40 parts of a material obtained by alkali digestion of a solid by-product residue from the acid hydrolysis of a pentosan-containing member of the order Graminales, said material having been obtained by digesting 100 parts of said residue with 10–45 parts of an alkaline water-soluble digesting agent taken from the group consisting of alkali metal salts whose 0.1N aqueous solutions have a pH of greater than 9.5, alkali metal hydroxides and mixtures thereof, said residue having a specific surface of from 400 cm.$^2$/g. to 6900 cm.$^2$/g., said adhesive composition being spreadable in a plywood glue spreader.

3. A thermosetting adhesive composition as in claim 2 wherein the pentosan-containing member is taken from the group consisting of ground oat hulls and ground corn cobs.

4. A thermosetting adhesive composition as in claim 2 wherein the residue before digestion has a particle size distribution such that at least about 25% of the residue passes through a 100 mesh standard screen.

5. A thermosetting adhesive composition as in claim 2 wherein the resin is a phenol-formaldehyde resin and from about 10–25 parts of the alkali digested material are used for each 40 parts of resin.

6. A thermosetting adhesive composition as in claim 5 wherein the digesting agent is sodium hydroxide.

7. A thermosetting adhesive composition as in claim 5 wherein the digesting agent is a mixture of sodium hydroxide and sodium carbonate.

8. A thermosetting adhesive composition as in claim 2 wherein the resin is a phenol-formaldehyde resin and from 25–40 parts of alkali digestive material are used for each 40 parts of resin.

9. A thermosetting adhesive composition as in claim 8 wherein the digesting agent is sodium hydroxide.

10. A thermosetting adhesive composition as in claim 8 wherein the digesting agent is a mixture of sodium hydroxide and sodium carbonate.

11. A process for the production of a smooth spreading, aqueous, thermosetting adhesive composition comprising (1) digesting with agitation at 50–70° F. for from 10–30 minutes (a) 100 parts of a solid by-product residue from the acid hydrolysis of a pentosan-containing member of the order Graminales, said residue having a specific surface of 400 cm.$^2$/g. to 6900 cm.$^2$/g., with (b) 10–45 parts of a water-soluble alkaline digesting agent taken from the group consisting of alkali metal salts whose 0.1N aqueous solutions have a pH of greater than 9.5, alkali metal hydroxides and mixtures thereof and (c) sufficient water to provide a workable dispersion of the digesting agent and the residue and then (2) adding a water-soluble phenol-formaldehyde resin to the dispersion and continuing the agitation thereof for at least 5 minutes to obtain a substantially homogeneous composition, the ratio of said digested residue to resin varying from 10–40 to 40–40.

12. A process as in claim 11 wherein the pentosan-containing member is selected from the group consisting of ground oat hulls and ground corn cobs.

13. A process as in claim 11 wherein the residue before digestion has a particle size distribution such that at least 25% of said residue passes through a 100 mesh standard screen.

14. A process as in claim 11 wherein the resin is a phenol-formaldehyde resin and from 10–25 parts of digested residue are employed per 40 parts of resin.

15. A process as in claim 14 wherein the digesting agent is sodium hydroxide.

16. A process as in claim 14 wherein the digesting agent is a mixture of sodium hydroxide and sodium carbonate.

17. A process as in claim 11 wherein the resin is a phenol-formaldehyde resin and from 25–40 parts of digested residue are employed per 40 parts of resin.

18. A process as in claim 17 wherein the digesting agent is sodium hydroxide.

19. A process as in claim 17 wherein the digesting agent is a mixture of sodium hydroxide and sodium carbonate.

20. A process for the production of a smooth spreading, aqueous, thermosetting adhesive composition, said process comprising suspending in water at 50–70° F. a solid by-product residue from the acid hydrolysis of a member of the group consisting of ground oat hulls and ground corn cobs, said residue having a particle-size distribution such that at least 25% passes through a 100 mesh standard screen, and adding to the suspension thus formed a water-soluble alkaline digesting agent taken from the group consisting of alkali metal salts whose 0.1 N aqueous solutions have a pH of greater than 9.5, alkali metal hydroxides and mixtures thereof, said digesting agent being added with constant agitation in amounts varying between 10 and 45 parts by weight per 100 parts of residue, agitating the suspension thus formed for from about 10 to about 30 minutes and then adding to the suspension with agitation a water-soluble phenol-formaldehyde resin and continuing the agitation for at least 5 minutes to obtain a substantially homogeneous composition, the amount of said resin varying between 100 and 400 parts per 100 parts of residue.

References Cited in the file of this patent

UNITED STATES PATENTS

| | | |
|---|---|---|
| 2,197,724 | Hovey | Apr. 16, 1940 |

FOREIGN PATENTS

| | | |
|---|---|---|
| 331,851 | Great Britain | July 8, 1930 |

OTHER REFERENCES

Clark et al.: Modern Plastics, October 1945, page 158.